A. DONATI.
BICYCLE STAND OR SUPPORT.
APPLICATION FILED MAR. 12, 1921.

1,392,749.

Patented Oct. 4, 1921.

WITNESSES
W. Harwood.
P. H. Pattison.

INVENTOR
A. DONATI
BY Munn & Co.
ATTORNEYS

UNITED STATES PATENT OFFICE.

ADOLPH DONATI, OF BROOKLYN, NEW YORK.

BICYCLE STAND OR SUPPORT.

1,392,749. Specification of Letters Patent. Patented Oct. 4, 1921.

Application filed March 12, 1921. Serial No. 451,692.

*To all whom it may concern:*

Be it known that I, ADOLPH DONATI, a citizen of the United States, and a resident of the city of New York, borough of Brooklyn, in the county of Kings and State of New York, have invented a new and Improved Bicycle Stand or Support, of which the following is a full, clear, and exact description.

The present invention relates to new and useful improvements in bicycles and the like, and it pertains more particularly to a stand or support thereof.

It is the primary object of the invention to provide a stand or support for bicycles, motorcycles, and the like, which is automatically held or retained in its inoperative position.

It is a further object of the invention to provide a device of this character which when in its operative position will automatically move to the inoperative position when the weight thereon is relieved.

It is a still further object of the invention to construct a device of this character which is capable of attachment without change to bicyles, motorcycles and the like of standard designs.

With the above and other objects in view, reference is had to the accompanying drawings, in which—

Figure 1:
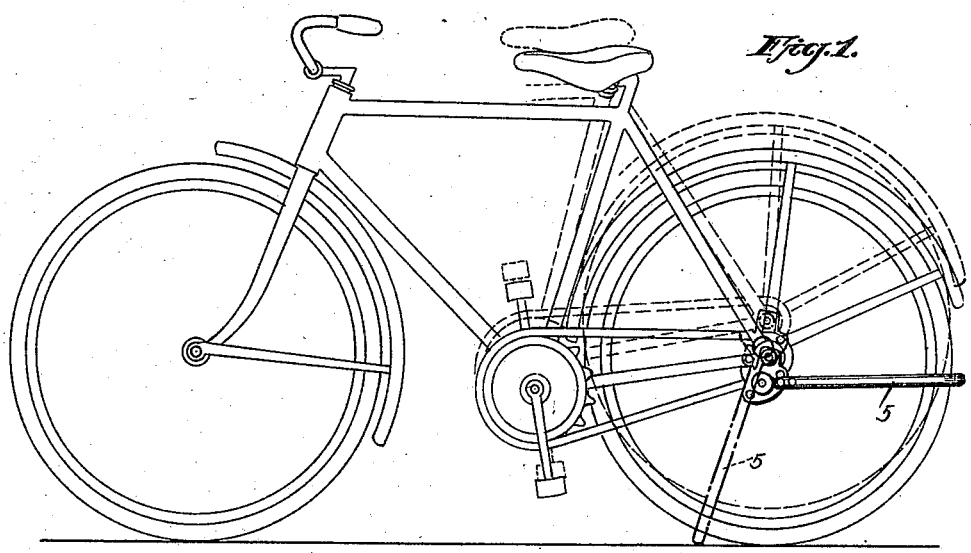
Figure 1 is a side elevation of a bicycle showing a device constructed in accordance with the present invention attached thereto.
Figure 2:
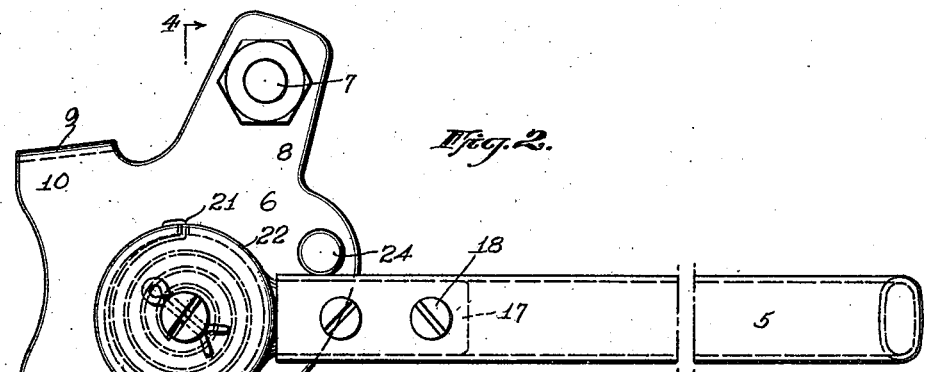
Fig. 2 is a side view of the device removed from the bicycle.
Figures 3, 4:
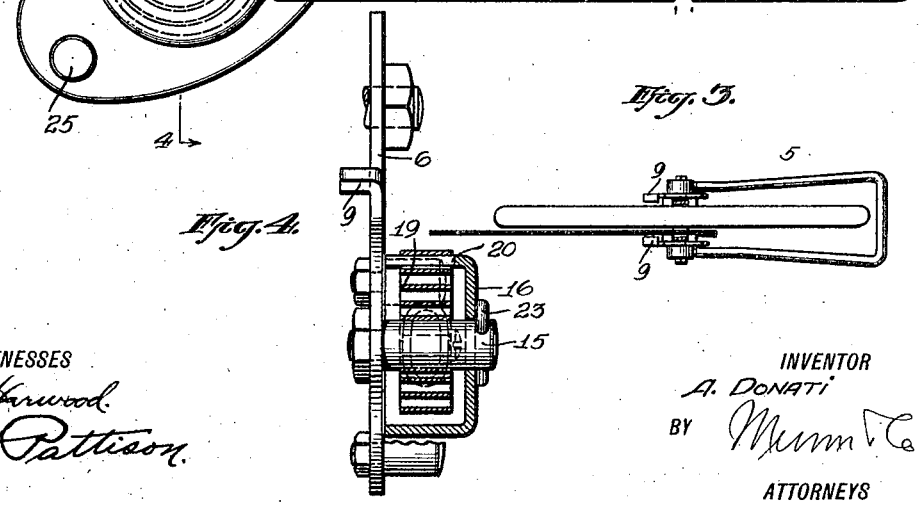
Fig. 3 is a horizontal sectional view showing the device in its inoperative position in top plan.
Fig. 4 is a sectional view taken on the line 4—4 of Fig. 2.

Referring more particularly to the drawings, the support or stand *per se* comprises a substantially U-shaped member 5 adapted to inclose the wheel of the device to which it is attached, and said U-shaped member 5 is pivotally mounted with respect to said wheel and is adapted when in its operative position to swing beneath the wheel as shown in dotted lines in Fig. 1, and when in inoperative position to swing in a horizontal position at the rear of the wheel as shown in full lines in Fig. 1. This U-shaped member 5 is pivotally mounted upon plates 6, there being one plate for each leg of the U-shaped member 5. These plates 6 are each provided with an opening or the like 7, for the reception of the axle of the wheel to which they are attached, it being understood that the opening passes through an arm 8 formed upon the plate 6 in such a manner as to drop the plate below the axle of the wheel. Each of these plates 6 is provided with a right-angular lip or lug 9 struck from a projecting portion 10, and each of said lips is adapted to engage its respective reach bar of the frame to prevent movement of the plates about their point of securement to the frame. Each of the plates 6 is provided with a stud 15 suitably secured thereto and rotatably mounted on each of said studs is a housing 16, each of said housings having a rearwardly projecting arm 17 adapted to be attached to its respective leg of the U-shaped member 5, by means of bolts, rivets or the like 18. Mounted upon each of the studs 15 and suitably secured thereto as indicated by the reference character 22, is a coil spring 19, the other end of which coil spring passes through a slot 20 in its respective housing 16 and has its end bent over as indicated by the reference character 21.

Each of the housings 16 is maintained in position upon its respective spindle by means of a cotter pin or the like 23. Each of the plates 6 is provided with two stops 24 and 25, the stop 24 serving to limit the movement of the U-shaped member in an upward direction and the stop 25 serving to limit the pivotal movement of the U-shaped member in the forward direction.

The device operates in the following manner:

With the parts in the position shown in full lines in Fig. 1, it is only necessary to grasp the U-shaped member 5 and rock it downwardly about its pivotal point to a point where it engages the ground, after which the bicycle is moved rearwardly in order that the U-shaped member 5 may assume the position shown in dotted lines in Fig. 1. During this operation the coil spring 19 is placed under tension and is held under tension by reason of the U-shaped member 5 supporting the weight of the bicycle and engaging the stop 25.

When it is desired to use the bicycle it is only necessary to lift the rear wheel thereof when under the influence of the spring 19, the U-shaped member 5 will be automatically returned to the position shown in full lines in Fig. 1 and will be retained in said position by means of the spring 19.

From the foregoing it is apparent that the present invention provides a new and novel stand or support for bicycles and the like, which is automatic in its operation, and, furthermore, such a device is provided in which no means for maintaining the device in the inoperative position is necessary.

I claim:

1. A stand for bicycles comprising a pair of plates carried by the bicycle, spindles carried by said plates, housings mounted on said spindles, resilient means interposed between the housings and the spindles and adapted to rotate the housings in one direction, a stand rigidly carried by said housings, and means carried by the plates for engagement with the stand for limiting the movement of the housings under the influence of the resilient means.

2. A stand for bicycles comprising a pair of plates carried by the bicycle, means for preventing movement of the plates relative to the bicycle, spindles carried by said plates, housings mounted on said spindles, a coil spring surrounding each of said spindles and having one of its ends attached thereto, the other end of each spring being attached to its respective housing, and a stand rigidly carried by each of said housings, said stand being adapted to be moved to operative position against the influence of said coil springs and to its inoperative position by the influence of said coil springs.

ADOLPH DONATI.